United States Patent [19]

Kocher

[11] 4,450,856
[45] May 29, 1984

[54] MEANS FOR RELEASABLY SECURING HAND-WHEEL TO VALVE SPINDLE

[75] Inventor: Erich J. Kocher, Milwaukee, Wis.

[73] Assignee: Vilter Manufacturing Corporation, Milwaukee, Wis.

[21] Appl. No.: 516,898

[22] Filed: Jul. 25, 1983

[51] Int. Cl.³ .................. F16K 43/00; F16K 31/50
[52] U.S. Cl. .................. 137/315; 16/114 R; 16/DIG. 30; 74/553; 251/214; 251/225; 251/274; 251/291; 403/16; 403/357
[58] Field of Search ............... 137/315; 251/128, 214, 251/218, 221, 223, 225, 264, 265, 273, 274, 291, 292; 74/553, 543, 557; 16/114 R, 121, 127, DIG. 24, DIG. 30; 403/16, 17, 356, 357

[56] References Cited

U.S. PATENT DOCUMENTS

| | | | |
|---|---|---|---|
| 1,802,002 | 4/1931 | Campbell, Jr. | 251/214 |
| 1,944,428 | 1/1934 | Hammon | 251/214 |
| 1,951,188 | 3/1934 | Flaherty | 16/DIG. 30 |
| 2,625,054 | 1/1953 | Bauman | 74/553 |
| 2,630,291 | 3/1953 | Gifford et al. | 251/366 |
| 3,055,632 | 9/1962 | Scaramucci | 251/214 |
| 3,145,010 | 8/1964 | Karr, Jr. | 251/214 |
| 3,559,950 | 2/1971 | Nelson | 277/110 |
| 4,311,164 | 1/1982 | Welch | 403/16 |

Primary Examiner—George L. Walton
Attorney, Agent, or Firm—James E. Nilles

[57] ABSTRACT

A large manually operated leak-proof corrosion-proof low-cost shut-off or stop valve for handling high pressure refrigerant liquids and/or gases comprises a valve body formed of two sheet metal hemispheres welded to the periphery of a circular metal valve plate having a fluid passage therethrough and hollow cylindrical metal tubes welded to the hemispheres along the edges of circular holes cut in the hemispheres. The cylindrical outer end of a valve spindle extends into a cylindrical bore in the hub of a hand-wheel which is rotatable to open and close the valve. The hand-wheel is secured to a valve spindle by a removable flanged roll pin which fits into a pin hole formed by mating or registering recesses formed in the periphery of the outer end of the valve spindle and in the peripheral wall of the bore in the hub of the hand-wheel. Unscrewing of the bonnet affords access to the sealing materials and, as the bonnet moves axially, it also shifts the hand-wheel off of the outer end of the valve spindle. As this occurs, the wheel hub engages the roll pin flange to force the roll pin out of the pin hole.

7 Claims, 14 Drawing Figures

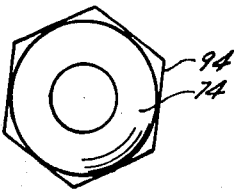
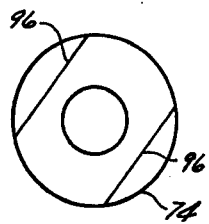
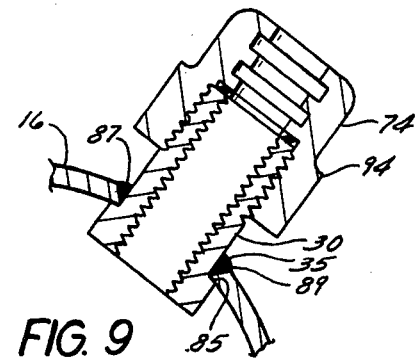
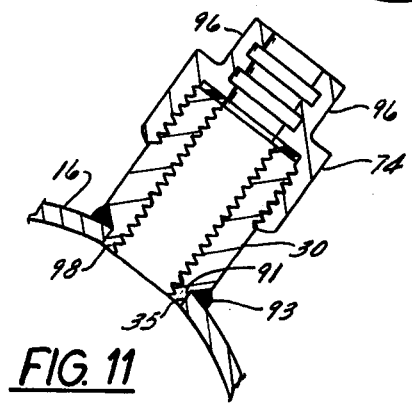
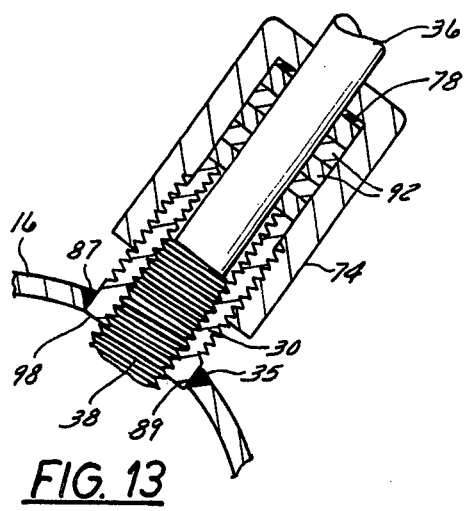
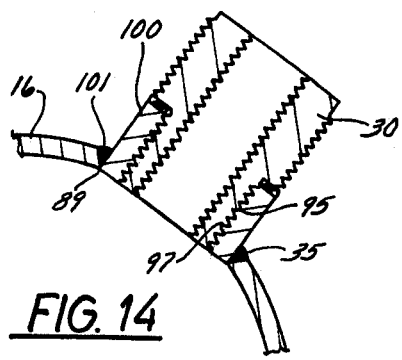

MEANS FOR RELEASABLY SECURING HAND-WHEEL TO VALVE SPINDLE

BACKGROUND OF THE INVENTION

1. Field of Use

This invention relates generally to relatively large manually operated leak-proof and corrosion-proof shut-off or stop valves for handling high pressure liquids and/or gases such as are used in refrigeration systems or the like.

In particular, the invention relates to means for releasably securing a hand-wheel or the like to a valve spindle which extends through a sleeve from the valve body.

2. Description of the Prior Art

Large industrial and commercial refrigeration systems employ refrigerants, such as ammonia, freon and the like, which are circulated through the system at high pressure in gaseous and liquid form. These refrigerants are costly (presently as much as $12.00 per pound) and any leakage in a large system not only reduces system efficiency but adds to cost of operation. Such systems require relatively large manually operable shut-off or stop valves to control fluid flow. Heretofore, such valves typically comprised a one-piece cast iron valve body with integrally formed threaded inlet and outlet flow tubes to which threaded pipe ends were connected. A rotatable valve spindle with a handle wheel on its outer end and a valve disc on its inner end extended from the valve body. Various types of valve spindle stuffing box arrangements were employed to seal against leakage of high pressure past the valve spindle. Also, various valve seating arrangements were employed to ensure proper valve closure. Threaded connections on the valve body very often proved to be prone to fluid loss. Furthermore, valve seat and valve disc designs and valve spindle stuffing box designs—often dictated by the configuration of a cast iron valve body—were susceptible to wear requiring servicing and replacement. Again, prior art valve designs often required substantial disassembly of the valve to enable servicing and part-replacement. Typically, disassembly of the stuffing box for the valve spindle first required removal of the hand-wheel from the valve spindle. Not uncommonly, the hand-wheel was force-fitted in place and its removal required use of a wheel or bearing puller. The following U.S. Patents illustrate the state of the art and show various attempts to avoid the use of threaded cast-iron valve housings to provide improved valve structures, to improve valve seals, to facilitate repairs and to employ technology aimed at cost reduction. U.S. Pat. Nos. 3,743,246 and 4,265,427 show gate valve bodies using geometrically shaped welded sections; U.S. Pat. Nos. 3,580,268, 3,678,556 and 3,518,742 are of a similar thrust; U.S. Pat. Nos. 3,523,551, 3,275,290, 4,322,058 and 3,337,183 concern stuffing box arrangements for valve stems.

SUMMARY OF THE INVENTION

A large manually operated leak-proof corrosion-proof low-cost shut-off or stop valve for handling high pressure refrigerant liquids and/or gases comprises a valve body formed of two sheet metal hemispheres welded to the periphery of a circular metal valve plate having a fluid passage therethrough and hollow cylindrical metal tubes welded to the hemispheres along the edges of circular holes cut in the hemispheres. One tube on each hemisphere serves for fluid flow. Another internally and externally threaded tube on one hemisphere serves as a valve sleeve through which a rotatable and axially shiftable externally threaded valve spindle extends. The inner end of the valve spindle is secured to a valve disc which releasably engages a valve seat around the fluid flow passage in the valve plate. The cylindrical outer end of the valve spindle extends into a cylindrical bore in the hub of a hand-wheel which is rotatable to open and close the valve. The hand-wheel is secured to the spindle by a removable flanged roll pin which fits into a pin hole formed by mating or registering recesses formed in the periphery of the outer end of the valve spindle and in the peripheral wall of the bore in the hub of the hand-wheel. A hollow internally threaded bonnet is screwed on to the externally threaded outer end of the valve sleeve and entraps sealing materials so as to form a seal and prevent leakage between the valve spindle and the valve sleeve. Unscrewing of the bonnet affords access to the sealing materials and, as the bonnet moves axially, it also shifts the hand-wheel off of the outer end of the valve spindle. As this occurs, the wheel hub engages the roll pin flange to force the roll pin out of the pin hole.

A valve in accordance with the invention offers several advantages over the prior art. For example, in some prior art valves, the operating member, whether in the form of a hand-wheel or lever, was force-fitted onto the end of the valve spindle. In addition, if the spindle was cylindrical and fitted into a cylindrical hole in the hand-wheel or lever hub, a pin, key or set-screw was employed to prevent relative rotation. Needless to say, in such arrangements removal of the key or pin, if any, was difficult, as was axial removal of the hand-wheel or lever, often requiring the use of a bearing puller. In the present invention, the hand-wheel or lever is not force-fitted but is secured by a resilient roll-pin. Furthermore, the roll-pin is flanged so that axial removal thereof is accomplished as the hand-wheel or lever moves axially. In addition, the bonnet as it is unscrewed bears on the underside of the wheel or lever hub and forces it off of the spindle. The threaded connection of the bonnet results in a substantial mechanical advantage as substantially great rotation and movement of the bonnet as it is being unscrewed is accomplished by relatively small axial movement thereof. Other objects and advantages of the invention will hereinafter appear.

DRAWINGS

FIG. 9 is a cross-section view showing an embodiment of a valve sleeve and sleeve bonnet which differs from that shown in FIG. 2;

FIG. 10 is an end view of the bonnet shown in FIG. 9;

FIG. 11 is a view similar to FIG. 9 but showing still another embodiment;

FIG. 12 is an end view of the bonnet shown in FIG. 11;

FIG. 13 is a view similar to FIGS. 9 and 11 of yet another embodiment; and

FIG. 14 is a view similar to FIGS. 9, 11 and 13 but showing another means for securing a valve sleeve to the valve body.

DESCRIPTION OF PREFERRED EMBODIMENTS

Figure 1:
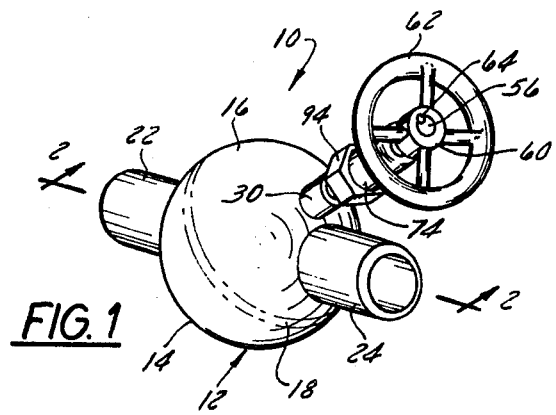
FIG. 1 is a perspective view of a valve in accordance with the invention.
Figure 2:
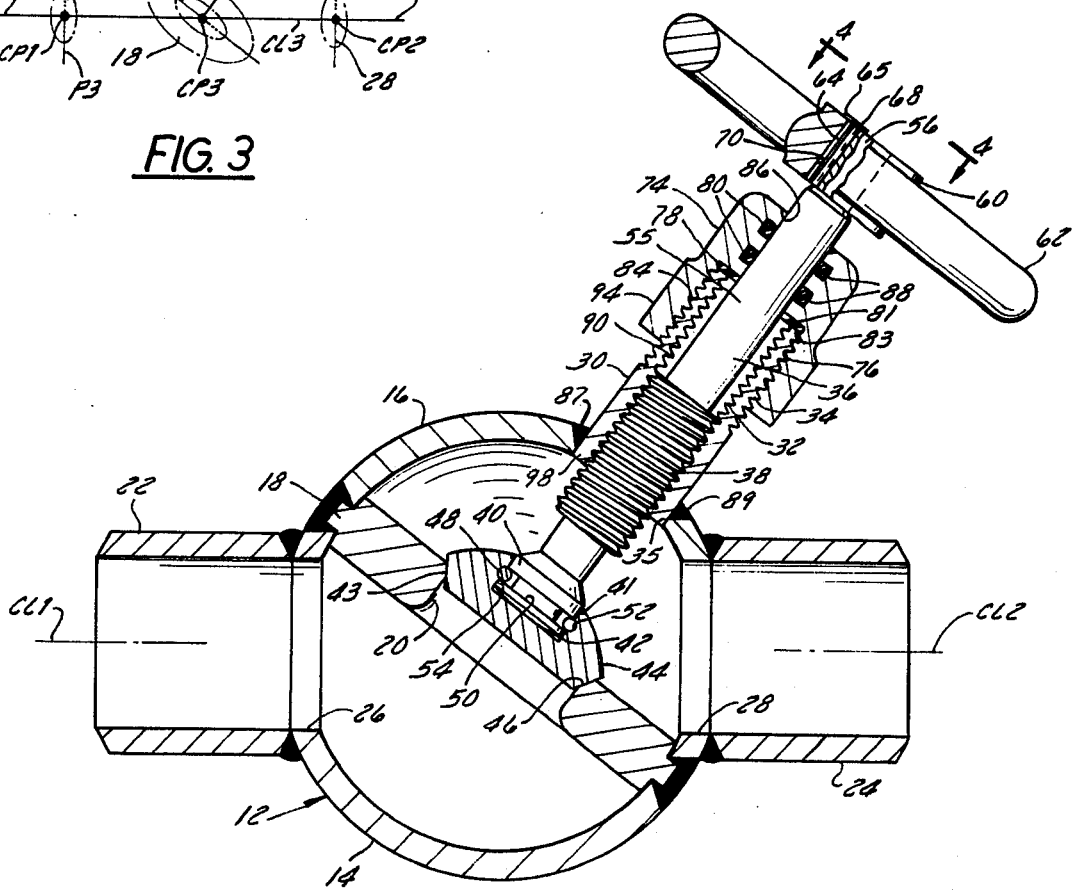
FIG. 2 is an enlarged cross-section view of the valve taken on line 2—2 of FIG. 1.

Referring to FIGS. 1 and 2, there is shown a valve 10 in accordance with the invention. Valve 10 preferably takes the form of a large manually operated leak-proof corrosion-proof low-cost shut-off or stop valve for handling high pressure refrigerant liquids and/or gases such as are used in refrigeration systems. Valve 10 comprises a spherical valve body 12 formed of two sheet metal hemispherical sections 14 and 16 welded to the periphery of a circular metal valve plate 18 which has a circular flow aperture or fluid passage 20 therethrough. Two hollow cylindrical metal fluid flow tubes 22 and 24 are welded to the hemispherical sections 14 and 16, respectively, along the edges of circular holes 26 and 28, respectively, which are cut in the sections.

A hollow cylindrical metal valve spindle sleeve 30, internally and externally threaded as at 32 and 34, respectively, is welded to hemispherical section 16 and communicates with a circular hole 35 formed in the section. A rotatable and axially shiftable valve spindle 36 extends through sleeve 30 and is externally threaded as at 38 to engage the threads 32.

Figure 6:
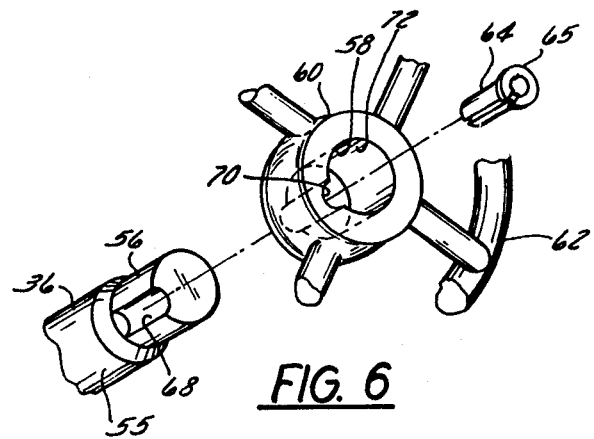
FIG. 6 is an isometric exploded view of a valve plate, the inner or lower end of the valve spindle, a valve disc and C-ring shown in FIG. 2.

The cylindrical inner end 40 of the valve spindle 36 extends into a cylindrical recess 42 in a metal valve disc 44 which releasably engages a valve seat 46 formed around fluid flow passage 20 in valve plate 18. The valve disc 44 is secured to the valve spindle 36 by a metal C-ring 48 of circular cross-section which engages an annular groove 50 formed in the periphery of the cylindrical inner end 40 of the valve spindle 36 and a registering annular groove 52 formed in the peripheral wall 54 of the cylindrical recess 42 in the valve disc 44, as FIGS. 2 and 6 show. Recess 42 is chamfered as at 41 to facilitate ring insertion.

Figure 4:
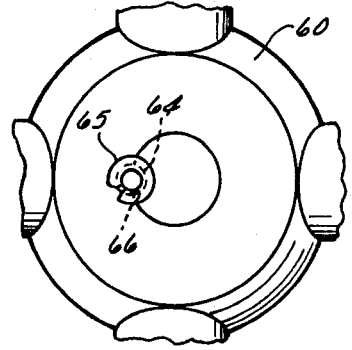
FIG. 4 is an enlarged top plan view of a portion of the hand-wheel and its associated spindle and roll pin taken on line 4—4 of FIG. 3.
Figure 5:
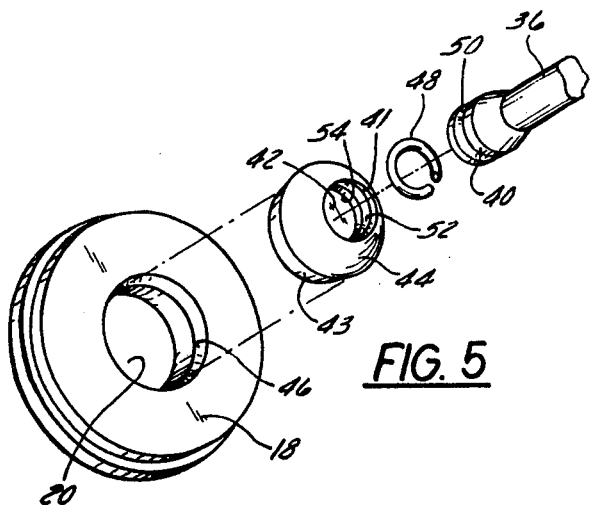
FIG. 5 is an isometric exploded view of the components shown in FIG. 2.

The cylindrical outer end 56 of the valve spindle 36 extends into a cylindrical bore 58 in the hub 60 of a hand-wheel 62 which is rotatable to open and close the valve. The hand-wheel 62 is secured to spindle 36 by a removable roll pin 64, having a flange 65, which pin fits into a pin hole 66 formed by mating or registering recesses 68 and 70 formed in the periphery of the outer end 56 of the valve spindle 36 and in the peripheral wall 72 of the bore 58 in the hub 60 of the hand-wheel 62, respectively, as FIGS. 2, 4 and 5 show.

A hollow bonnet 74 internally threaded as at 76 is screwed on to the external threads 34 on the outer end of the valve spindle sleeve 30 and entraps sealing materials 78 so as to form a seal between the valve spindle 36 and the valve spindle sleeve 30 and also entraps a plurality of O-rings 80 between the valve spindle 36 and the bonnet 74. Unscrewing of the bonnet 74 affords access to the sealing materials 78 and O-rings 80 and, as the bonnet moves axially, it also axially shifts the hand-wheel 62 off of the outer end 56 of the valve spindle 36. As this occurs, the wheel hub 60 engages the roll pin flange 65 to force the roll pin 64 out of the pin hole 66.

The metal components thus far described could be formed of any suitable metal. But, a valve 10 designed for use with fluids tending to cause rust, corrosion or oxidation is preferably fabricated of stainless steel. Furthermore, the hemispherical sections 14 and 16, the valve plate 18, the tubes 22 and 24 and the sleeve 30 are preferably formed of seamless materials to enhance their strength in a high pressure system. The holes 26, 28 and 35 in the body are perfectly circular and are preferably cut by a gas torch or laser beam. Thus, those pieces of the hemispherical sections 14 and 16 which are removed to form the holes 26, 28 and 35 are geometric shapes defined as "spherical segments". Preferably, all welds are carried out by electron beam welding so that only material from adjoining components is employed in the weld, rather than extraneous welding material, thereby providing a cleaner, stronger joint and a weld which is more easily carried out.

Figure 3:
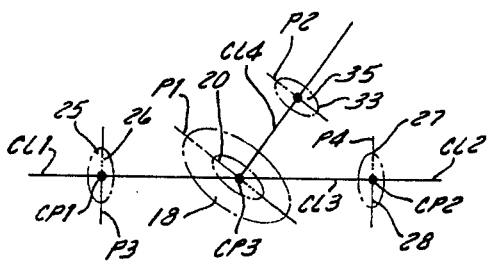
FIG. 3 is a schematic diagram showing the planar and linear relationships of the holes formed in the spherical valve body shown in FIG. 2.

As FIGS. 1, 2 and 3 show, the components forming body 12 of valve 10 are symetrical and identical in shape and size, in so far as possible, so as to be interchangeable and thereby reduce manufacturing costs. The components are also symetrically arranged in accordance with basic geometric shapes so as to avoid the problem associated with forming and assembling irregular shapes. Thus, as shown in FIG. 3, the valve plate 18 lies in a first plane P1, the circumferential edge 33 of hole 35 lies in a second plane P2 which is parallel to plane P1, the circumferential edge 25 of the flow hole 26 lies in a third plane P3, and the circumferential edge 27 of the flow hole 28 lies in a fourth plane P4 which is parallel to plane P3. The axial centerlines CL1 and CL2 of the flow tubes 22 and 24 are axially aligned with a centerline CL3 which extends between the centerpoints CP1 and CP2 of the holes 26 and 28. The axial centerline CL4 of sleeve 30 passes through centerpoint CP3 of valve plate 18 (and through the centerpoint of the aperture 20 therein). The centerpoint CP3 is located at the midpoint of centerline CL3. The centerline CL4 lies in a plane which is perpendicular to plane P1. This arrangement of the holes 26, 28 and 35 is the simplest from a geometric standpoint and simplifies jigging the hemispheres and other components during cutting, assembly and welding.

In the embodiment shown in FIG. 2, the valve seat 46 around aperture 20 in valve plate 18 is conical and the valve disc 44 is provided with a conical mating surface 43 to provide a "plug type" valve seating arrangement.

Figure 7:
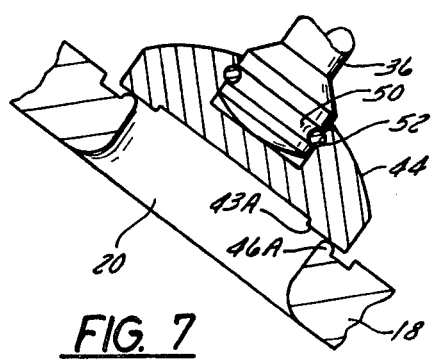
FIG. 7 is a cross-section view showing an embodiment of a valve seat and a valve disc which differs from that shown in FIGS. 2 and 6.

In the embodiment shown in FIG. 7, a "flat-lapped" valve seat arrangement is shown in which a raised or projecting annular valve seat 46A is provided on valve plate 18 for engagement with a raised flat mating surface 43A on the valve disc 44. The plate 18 and valve disc 44 are made of hardened metal in both FIGS. 2 and 7.

Figure 8:
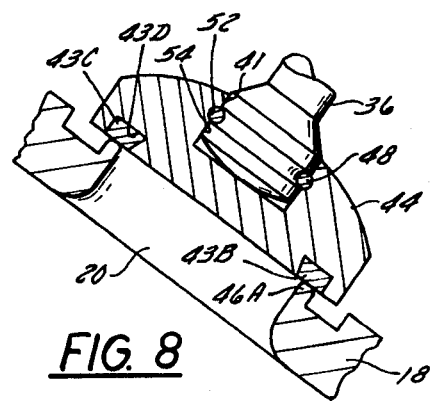
FIG. 8 is a view similar to FIG. 7 but showing still another embodiment.

In the embodiment shown in FIG. 8, a "Babbit" or soft metal seating arrangement is shown in which a hardened raised or projecting valve seat 46A is provided on valve plate 18 for engagement with a flat mating surface 43B of an annular soft metal insert 43C located in an annular recess 43D in valve disc 44.

In the embodiment shown in FIG. 2, the sealing or packing material takes the form of a compressible or deformable washer 78 fabricated of packing or stuffing material and disposed around the unthreaded portion 55 of valve spindle 36 and between a flat end surface 81 of sleeve 30 and a flat shoulder or end wall surface 83 in the bore 84 in bonnet 74. The narrower portion 86 of bore 84 through which the unthreaded portion 55 of valve spindle 36 extends is provided with two annular grooves 88 in which the O-rings 80 are located. When the bonnet 74 is screwed down tight, the washer 78 deforms and tightly seals the space between the unthreaded portion 55 of spindle 36 and the wall of the bore 90 in sleeve 30, as well as the space between portion 55 and the narrower bore portion 86 in the bonnet 74.

In the embodiment shown in FIGS. 9 through 12, the sealing or packing arrangements are understood to be substantially the same as shown in FIG. 2.

In the embodiment shown in FIG. 13, several packing rings 92, one above the other, are provided beneath the washer 78 and the O-rings are omitted.

FIGS. 2, 9, 10, 11 and 12 show bonnets 74 of various configurations as regards tool-engaging surfaces whereby the bonnets are screwed and unscrewed. FIGS. 2, 9 and 10 show a hex-head nut configuration having six flats 94. FIGS. 11 and 12 show a nut configuration having two flats 96.

FIGS. 2, 9, 11 and 14 show different arrangement for securing valve sleeve 30 to the hemispheric section 16 in communication with the circular hole 35. In FIGS. 2 and 13 the end edge 98 of sleeve 30 is welded as at 87 to the lower portion of a conically shaped or chamfered edge 89 of hole 35. In FIG. 9 sleeve 30 includes a shoulder 85 at its lower end which engages the inner surface of hemispheric section 16 adjacent and beneath the chamfered edge 89 of hole 35 where welding occurs as at 87. In FIG. 11 a reduced diameter cylindrical portion 98 at the lower end of sleeve 30 fits within the flat edge 91 of hole 35 and is welded in place as at 93. In FIG. 14, sleeve 30 is provided with external threads 95 at its lower end and these engage internal threads 97 formed in the bore of a hollow cylindrical weld ring 100 which is welded as at 101 to the lower portion of chamfered edge 83 of hole 35.

We claim:
1. A valve comprising:
   a sleeve;
   a rotatable spindle extending from said sleeve;
   a hollow bonnet surrounding said spindle and sleeve and threadably secured to the latter;
   an operating member having a hub with a hole therein for attachment to the outer end of said spindle;
   and means for releasably connecting said operating member to said spindle comprising: a pin-hole parallel to said hole in said hub and defined by registering adjacent depressions formed in said hub at the side of said hole therein and in a side of said outer end of said spindle, and a flanged pin inserted in said pin-hole, said pin being removed from said pin-hole in response to unscrewing of said bonnet which engages and moves said operating member axially off of said spindle, which movement of said operating member forces said pin from said pin-hole.

2. A valve according to claim 1 wherein said flanged pin is a resilient roll-pin.

3. A valve according to claim 1 or 2 wherein said sleeve has external threads and wherein said bonnet has internal threads for engagement with said external threads.

4. A valve according to claim 3 wherein said spindle comprises an abutment against which said hub is seated.

5. A valve comprising:
   a hollow sleeve having an outer end;
   a rotatable spindle having an outer end extending from said sleeve, said outer end having a shoulder thereon;
   a bonnet having a bore therethrough for accommodating said sleeve and said spindle, said bonnet being threadably secured by screw threads to said sleeve and defining a space in which sealing materials are entrapped to prevent leakage, said bonnet, when rotated in the unscrewing direction, moving toward and being detachable from said outer end of said sleeve;
   an operating member for attachment to said spindle adjacent said shoulder and including a hub having a hole therein for accommodating said outer end of said spindle;
   and means for connecting said operating member to said outer end of said spindle so that rotation of said member effects corresponding rotation of said spindle and to enable detachment of said operating member from said spindle, said means comprising a pin-hole having a longitudinal axis parallel to the axis of said hole in said hub, said pin-hole being defined by registering and adjacent depressions formed in said hub and in said outer end of said spindle, said means further comprising a roll-pin inserted in said pin-hole and having a flange engageable with the outer surface of said hub, said roll-pin operating to transmit rotary motion from said operating member to said spindle, said roll-pin being axially shiftable out of said pin-hole in response to axial shifting of said operating member off of the outer end of said shaft as said bonnet is being unscrewed and comes into engagement with said hub.

6. A valve according to claim 5 wherein said hole in said hub and said outer end of said spindle each have a cylindrical cross-section.

7. A valve according to claim 6 wherein said pin-hole and said pin each have a cylindrical cross-section.

* * * * *